(12) United States Patent
Cho et al.

(10) Patent No.: US 11,676,407 B2
(45) Date of Patent: Jun. 13, 2023

(54) SYSTEM AND METHOD FOR SUPPORTING USER TO READ X-RAY IMAGE

(71) Applicant: KOREA INSTITUTE OF SCIENCE AND TECHNOLOGY, Seoul (KR)

(72) Inventors: Junghyun Cho, Seoul (KR); Hyunwoo Cho, Seoul (KR); Haesol Park, Seoul (KR); Ig Jae Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 315 days.

(21) Appl. No.: 17/104,404

(22) Filed: Nov. 25, 2020

(65) Prior Publication Data
US 2022/0036066 A1 Feb. 3, 2022

(30) Foreign Application Priority Data
Jul. 30, 2020 (KR) ........................ 10-2020-0095158

(51) Int. Cl.
| | |
|---|---|
| *G06K 9/00* | (2022.01) |
| *G06V 20/70* | (2022.01) |
| *G06T 7/11* | (2017.01) |
| *G06T 7/13* | (2017.01) |
| *G06T 11/00* | (2006.01) |
| *G06F 16/953* | (2019.01) |
| *G06V 10/40* | (2022.01) |

(Continued)

(52) U.S. Cl.
CPC ............ *G06V 20/70* (2022.01); *G06F 16/953* (2019.01); *G06F 18/214* (2023.01); *G06F 18/24* (2023.01); *G06T 7/11* (2017.01); *G06T 7/13* (2017.01); *G06T 11/001* (2013.01); *G06V 10/40* (2022.01); *G06T 2207/10116* (2013.01); *G06T 2207/20081* (2013.01); *G06T 2207/20221* (2013.01)

(58) Field of Classification Search
CPC .......... G06V 20/00; G06V 10/40; G06T 7/11; G06T 7/13; G06T 11/001; G06T 2207/10116; G06T 2207/20081; G06T 2207/20221; G06F 16/953; G06K 9/6256; G06K 9/6267
See application file for complete search history.

(56) References Cited

U.S. PATENT DOCUMENTS

| | | | |
|---|---|---|---|
| 10,122,973 B2 | 11/2018 | Zhao et al. | |
| 10,302,807 B2 * | 5/2019 | Yu | .............................. G06T 7/60 |
| 10,540,578 B2 * | 1/2020 | Madani | .................... G06N 3/08 |

(Continued)

FOREIGN PATENT DOCUMENTS

| | | |
|---|---|---|
| EP | 3171332 B1 | 1/2019 |
| JP | 2007-524438 A | 8/2007 |

(Continued)

*Primary Examiner* — Gregory M Desire
(74) *Attorney, Agent, or Firm* — Cantor Colburn LLP

(57) ABSTRACT

Disclosed are an X-RAY image reading support method including the steps of acquiring a target X-RAY image photographed by transmitting or reflecting X-RAY in a reading space in which an object to be read is disposed; applying the target X-RAY image to a reading model that extracts features from an input image; and identifying the object to be read as an object corresponding to a classified class when the object to be read is classified as a set class based on a first feature set extracted from the target X-RAY image, and an X-RAY image reading support system performing the method.

22 Claims, 8 Drawing Sheets

(51) Int. Cl.
  *G06F 18/24* (2023.01)
  *G06F 18/214* (2023.01)

(56) References Cited

U.S. PATENT DOCUMENTS

| | | | |
|---|---|---|---|
| 10,558,783 B2 * | 2/2020 | Ahmed | G16H 50/50 |
| 10,832,391 B2 * | 11/2020 | Perticone | G06T 7/73 |
| 10,861,129 B2 * | 12/2020 | Song | G06V 10/462 |
| 11,073,488 B2 * | 7/2021 | Reischig | G01N 23/203 |
| 11,132,792 B2 * | 9/2021 | Zhang | G06N 3/0472 |
| 11,475,684 B1 * | 10/2022 | Deng | G06N 3/08 |
| 2020/0051291 A1 | 2/2020 | Cinnamon et al. | |

FOREIGN PATENT DOCUMENTS

| | | |
|---|---|---|
| JP | 2017-531228 A | 10/2017 |
| KR | 101778503 B1 | 9/2017 |
| KR | 10-1890538 B1 | 8/2018 |
| KR | 101917000 B1 | 11/2018 |
| KR | 10-1969022 B1 | 4/2019 |
| KR | 102067367 B1 | 2/2020 |
| WO | 2004/086972 A2 | 10/2004 |
| WO | 2016/019576 A1 | 2/2016 |

* cited by examiner

SYSTEM AND METHOD FOR SUPPORTING USER TO READ X-RAY IMAGE

CROSS-REFERENCE TO RELATED APPLICATION

This application claims priority to Korean Patent Application No. 10-2020-0095158, filed on Jul. 30, 2020, and all the benefits accruing therefrom under 35 U.S.C. § 119, the contents of which in its entirety are herein incorporated by reference.

BACKGROUND OF THE INVENTION

Description of National Research and Development Support

This research has been conducted under the supervision of National Science and Technology Research Association with the support of Ministry of Science and Information and Communication Technology (project name; Development of technology to detect false reports of smuggled articles based on fake images, project number; CAP-18-03-ETRI).

Field of the Invention

The present invention relates to X-RAY image reading support system and method, and more particularly, to a system and a method for supporting a user to read an X-RAY image capable of identifying an object to be read shown in a target X-RAY image based on a reading model learned using a fake X-RAY image in order to support a task of reading a target X-RAY image to be read.

Description of the Related Art

In the modern society, due to the development of the transportation industry and the IT industry, domestic/overseas cargo transportation is actively conducted. Cargo for overseas transportation includes personal cargo that is loaded together on a transport means (e.g., aircraft or ship) on which an individual is boarded according to personal travel, and export cargo that is loaded on a large scale according to business transactions.

In the case of overseas transportation, when the cargo is carried out from a departure country of the transport means and/or when the cargo is carried in at a destination country of the transport means, customs department of the corresponding country will inspect whether there is cargo that is against regulations associated with foreign cargo, such as customs regulations, transport regulations, or security regulations. For example, the customs department of the departure country may check whether personal cargo contains cargo that cannot be loaded onto an aircraft (e.g., dangerous articles) for aviation security. Alternatively, the customs department of the destination country may inspect whether there are smuggled articles that are nonconforming for customs regulations.

Such cargo inspection includes a method in which a customs officer directly inspects the cargo by opening a space in which the cargo is loaded (e.g., a container, a cargo compartment, etc.); or a method of inspecting the cargo based on an X-RAY image acquired through an X-RAY inspection device. First, the method of inspecting the cargo by opening a container or the like has a disadvantage that it takes a lot of time and high inspection cost is required. Therefore, the cargo inspection for overseas transportation is conducted by an X-RAY-based inspection method capable of inspecting a large number of cargo during a unit time.

FIG. 1 is a schematic diagram of an X-RAY based inspection method according to an embodiment in the related art, and FIG. 2 is a diagram illustrating an image used for the inspection of FIG. 1.

Referring to FIG. 1, in the case of customs inspection for export cargo transported from foreign countries, a reading space includes a space (e.g., a container) in which cargo is placed in a vehicle (e.g., a container truck). When X-rays are emitted into the reading space and an amount transmitted or reflected through an object is detected, photographing information is obtained, and as a result, an X-RAY image of the reading space is acquired as illustrated in FIG. 2. In the related art, the customs officer compares information on the cargo contained in the reading space with the X-RAY image acquired by directly photographing the reading space to read whether an object shown in the X-RAY image of the reading space corresponds to articles included in a cargo list. That is, the inspection is performed by comparing text information on the object to be read in the target X-RAY image with the target X-RAY image.

However, this X-RAY-based inspection method has a limitation in that the inspection result depends on the reader's skill level or fatigue level.

CITATION LIST

Patent Literature

Patent Literature 1: Korean Patent Registration No. 10-1917000 (Nov. 2, 2018)

SUMMARY OF THE INVENTION

According to various aspects of the present invention, in order to minimize the dependence on the reader's skill level or condition and to support a task of reading a target X-RAY image to be read by a user, there are provided a system and a method for supporting X-RAY image reading capable of identifying an object to be read shown on a target X-RAY image based on a reading model learned using a fake X-RAY image.

According to an aspect of the present invention, there is provided an X-RAY image reading support system including: an X-RAY photographing device configured to photograph a target X-RAY image by transmitting or reflecting X-RAY in a reading space in which an object to be read is disposed; an interface unit configured to receive list information on an object; an image search unit configured to acquire a non-X-RAY image of the object; an image conversion unit configured to convert a non-X-RAY image of an item object in a list into a fake X-RAY image; and an article discrimination unit configured to identify the object to be read based on a first feature set extracted by applying the target X-RAY to a reading model for extracting features from an input image.

In one embodiment, the image search unit may be configured to generate a search query for the corresponding object based on identification information of the object included in the list information on the object, and to transmit the search query to a web server to receive the searched image as the non-X-RAY image of the object.

In one embodiment, the web server may be a server that is configured to be accessible through a world wide web and enabled for web search.

In one embodiment, the image conversion unit may be configured to calculate segmentation information of the non-X-RAY image by segmenting the object of the non-X-RAY image into segments, wherein the segment is formed of an area or a partial area of the object and the segmentation information includes at least one of boundary and location information of the segment in the image, calculate an outline area of the segment corresponding to the object from the segmentation information, calculate a texture map from an arbitrary X-RAY image, and apply the segmentation information and the texture map to an image conversion model.

In one embodiment, the image conversion model may be pre-learned to output a fake X-RAY image that is the same as or similar to a real X-RAY image photographed as a photographing object by the X-RAY photographing device in a background of the arbitrary X-RAY image.

In one embodiment, the image conversion unit may be further configured to, when the object is included in the arbitrary X-RAY image, calculate an outline area of the object in the arbitrary X-RAY image by segmenting the arbitrary X-RAY image, and calculate a texture map by removing the outline area of the object in the arbitrary X-RAY image from the texture information.

In one embodiment, the image conversion unit may be further configured to randomly arrange the segments of the segmentation information at one or more different locations. The segmentation information applied to the image conversion model may include a segment disposed at an original location and a segment randomly disposed at another location in the non-X-RAY image.

In one embodiment, the image conversion unit may generate a composite image including the segment in the segmentation information as an object and the texture map as a background, and apply the composite image to the image conversion model.

In one embodiment, the segmentation information may be calculated by applying the searched non-X-RAY image of the item object in the list to a segmentation model, and the segmentation model may be configured to label pixels of the input image with a pre-learned class.

In an embodiment, the arbitrary X-RAY image may be a real X-RAY image of the reading space.

In one embodiment, the image conversion model may be learned to generate, as a fake X-RAY image, data of an output image that makes a data distribution and a restoration error of a training image used for learning to be minimized or to belong to the data distribution when the data is received.

In one embodiment, the image conversion model may be a model learned using a first training data set including a plurality of first training samples, wherein each of the plurality of first training samples may include a real X-RAY image of a first training object, segmentation information and a texture map of the real X-RAY image of the first training object, respectively, or include the real X-RAY image of the first training object and a composite image based on the segmentation information and the texture map of the real X-RAY image of the first training object, respectively.

In one embodiment, the first training sample may be generated by calculating segmentation information by segmenting the first training object into segments in the real X-RAY image of the first training object, calculating an outline area of the first training object from the segmentation information, calculating texture information from the real X-RAY image of the training object, and calculating a texture map by removing the outline area of the first training object from the texture information.

In one embodiment, the non-X-RAY image may be an image photographed with visible light.

In one embodiment, the reading model may include a feature extraction portion for extracting features from the input image; and classification portion for classifying the object of the input image into a class set using the training data set based on the extracted features, wherein the reading model may be a machine learning model learned using a second training data set including a plurality of second training samples, wherein the second training data set is sub-set into individual objects, and each of the plurality of second training samples may include a real X-RAY image of the second training object or a fake X-RAY image of the second training object.

In one embodiment, the article discrimination unit may identify the object to be read as an object corresponding to the classified class when the object to be read is classified as a set class based on the first feature set extracted from the target X-RAY image.

In one embodiment, when the object to be read is not identified by the reading model, the interface unit may receive list information including one or more item objects related to the object to be read, the image search unit may acquire a non-X-RAY image of an item object in a list related to the object to be read based on the list information, and the image conversion unit may convert the non-X-RAY image of the item object in the list into a fake X-RAY image. The article discrimination unit may be further configured to extract a second feature set from the fake X-RAY image of the item object in the list by applying the fake X-RAY image of the item object in the list to the feature extraction portion, and identify the object to be read as the item object in the list when it is determined that the object to be read expressed in the target X-RAY image matches the item object in the list based on the extracted first and second feature sets.

According to another aspect of the present invention, there is provided an X-RAY image reading support method which is performed by a processor, including the steps of: acquiring a target X-RAY image photographed by transmitting or reflecting X-RAY in a reading space in which an object to be read is disposed; applying the target X-RAY image to a reading model that extracts features from an input image; and identifying the object to be read as an object corresponding to a classified class when the object to be read is classified as a set class based on a first feature set extracted from the target X-RAY image. The reading model may include a portion of extracting features from the input image and a portion of classifying the object of the input image as a class set using a plurality of training samples based on the extracted features, and the reading model may be a machine learning model learned using the plurality of first training samples, wherein the plurality of first training samples may be sub-set into individual objects, and each of the plurality of first training samples may include a real X-RAY image or a fake X-RAY image of the first training object, respectively.

In one embodiment, the fake X-RAY image may be generated by calculating segmentation information from a non-X-RAY image of the first training object by segmenting the first training object into segments, wherein the segment is formed of an area or a partial area of the first training object and the segmentation information includes at least one of boundary and location information of the segment in the image, calculating an outline area of the first training object from the segmentation information, calculating a texture map from an arbitrary X-RAY image, and applying the segmentation information of the first training object and the texture map of the arbitrary X-RAY image to an image conversion model.

In one embodiment, the image conversion model may be pre-learned to output a fake X-RAY image that is the same as or similar to a real X-RAY image photographed as a photographing object by the X-RAY photographing device in a background of the arbitrary X-RAY image.

In one embodiment, the X-RAY image reading support method may further include the steps of: receiving list information including one or more item objects related to the object to be read; acquiring a non-X-RAY image of an item object in a list related to the object to be read based on the list information; converting the non-X-RAY image of the item object in the list into a fake X-RAY image; extracting a second feature set from the fake X-RAY image of the item object in the list when the object to be read is not identified as a class; and identifying the object to be read as the item object in the list when it is determined that the object to be read expressed in the target X-RAY image matches the item object in the list based on the extracted first and second feature sets.

In one embodiment, the reading model may be a machine learning model learned using a second training data set including a plurality of second training samples, wherein the second training data set may be sub-set into individual objects, wherein each of the plurality of second training samples may include a real X-RAY image of the second training object or a fake X-RAY image of the second training object, respectively.

According to yet another aspect of the present invention, there is provided a computer-readable recording medium which is readable by a computing device and stores program commands operable by the computing device. When the program commands are executed by a processor of the computing device, the processor may perform the X-RAY image reading support method according to the above-described embodiments.

BRIEF DESCRIPTION OF THE DRAWINGS

In order to more clearly describe the technical solutions of the embodiments of the present invention or the related art, the drawings required for the description of the embodiments will be briefly introduced below. It is to be understood that the following drawings are just for describing the embodiments of the present specification, not for the purpose of limitation. In addition, some elements to which various modifications such as exaggeration and omission are applied will be illustrated in the following drawings for clarity of description.

DETAILED DESCRIPTION OF THE PREFERRED EMBODIMENTS

The terms used herein is for the purpose of describing specific exemplary embodiments only and are not intended to be limiting of the present invention. The singular forms used herein include plural forms as well, if the phrases do not clearly have the opposite meaning. The "comprising" used in the specification means that a specific feature, region, integer, step, operation, element and/or component is embodied and does not exclude other specific features, regions, integers, steps, operations, elements, components, and/or groups.

Unless defined otherwise, all terms including technical and scientific terms used herein have the same meaning as commonly understood by those skilled in the art to which the present invention belongs. Commonly used predefined terms are further interpreted as having a meaning consistent with the relevant technical literature and the present disclosure, and are not to be construed as ideal or very formal meanings unless defined otherwise.

Hereinafter, embodiments of the present invention will be described in detail with reference to the accompanying drawings.

Figure 3:
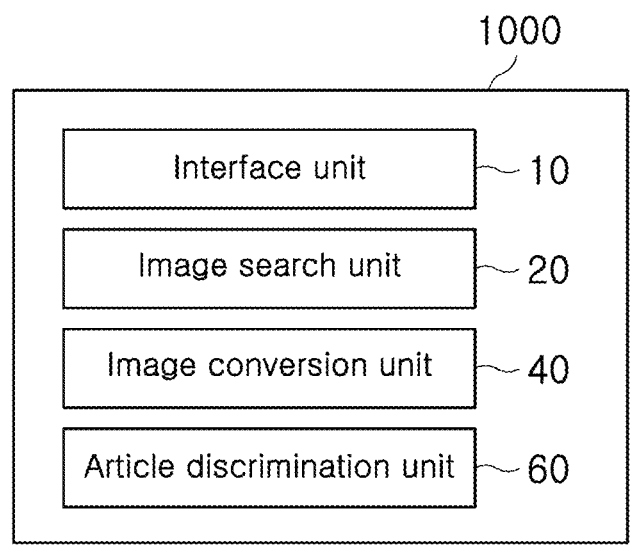
FIG. 3 is a schematic diagram of an X-RAY reading support system according to an embodiment of the present invention.
Figure 4:
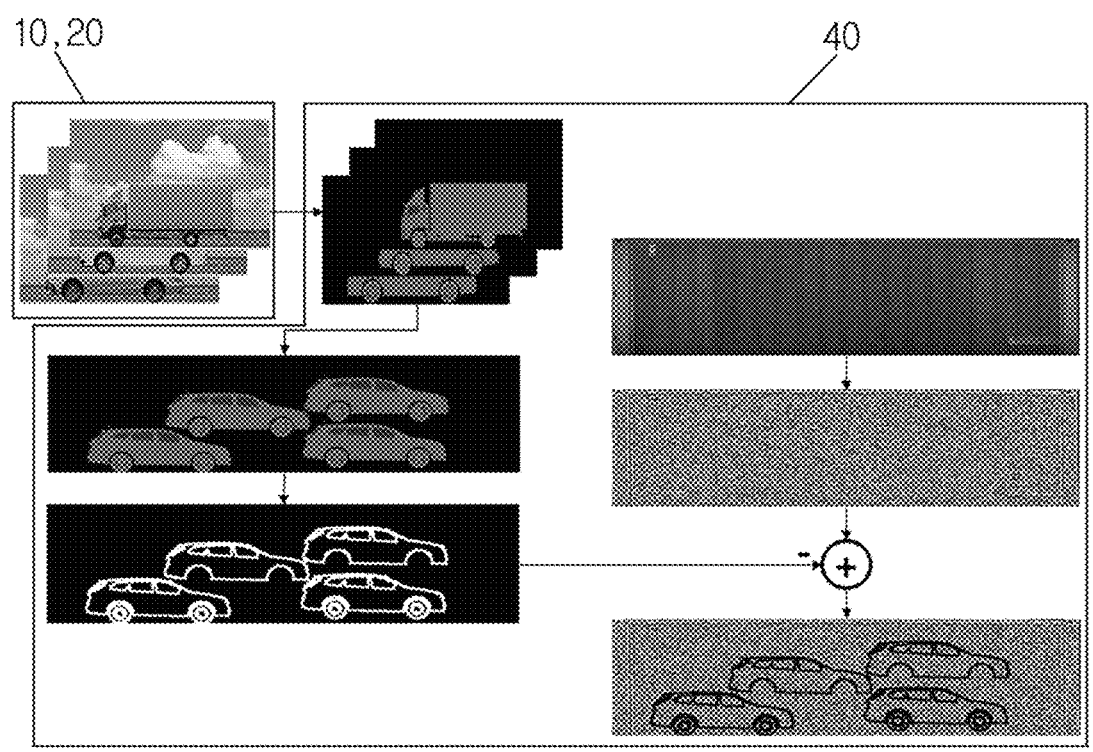
FIG. 4 is a schematic diagram of an operation performed by the X-RAY reading support system of FIG. 3.

FIG. 3 is a schematic diagram of an X-RAY reading support system according to an embodiment of the present invention, and FIG. 4 is a schematic diagram of an operation performed by the X-RAY reading support system of FIG. 3.

Referring to FIG. 3, a system for supporting a user to read an X-RAY image (hereinafter, referred to as an "X-RAY reading support system") 1000 may include an interface unit 10; an image search unit 20; an image conversion unit 40; and an article discrimination unit 60. In specific embodiments, the X-RAY reading support system 1000 may be further configured to communicate electrically with an X-RAY photographing device (not illustrated) that photographs an object existing in a photographing range through x-rays. In one embodiment, the photographing result of the X-RAY photographing device may be transmitted to the interface unit 10.

The X-RAY reading support system 1000 according to the embodiments may have an aspect that is entirely hardware, entirely software, or partially hardware and partially software. For example, the system may collectively refer to hardware equipped with data processing capability and operating software for driving the hardware. In this specification, terms such as "unit", "module", "device", or "system" are intended to refer to a combination of hardware and software driven by the hardware. For example, the hardware may be a data processing device including a central processing unit (CPU), a graphic processing unit (GPU), or another processor. In addition, the software may refer to an executing process, an object, an executable file, a thread of execution, a program, and the like.

The X-RAY photographing device is configured to emit x-rays to a reading space including an object, and to receive x-rays transmitted or reflected through the reading space to output photographing information. An X-RAY image as illustrated in FIG. 2 is acquired by the X-RAY photographing device.

The reading space varies depending on where the X-RAY reading support system 1000 is installed. For example, when the X-RAY reading support system 1000 is applied to a harbor dock, the reading space may include a space in or through which the container is located or passes. Alternatively, when the X-RAY reading support system 1000 is applied to airport security, the reading space may include a space in or through which baggage is located or passes.

Various devices for generating an X-RAY image using x-rays may be used as the X-RAY photographing device of the X-RAY reading support system 100.

Figure 1:
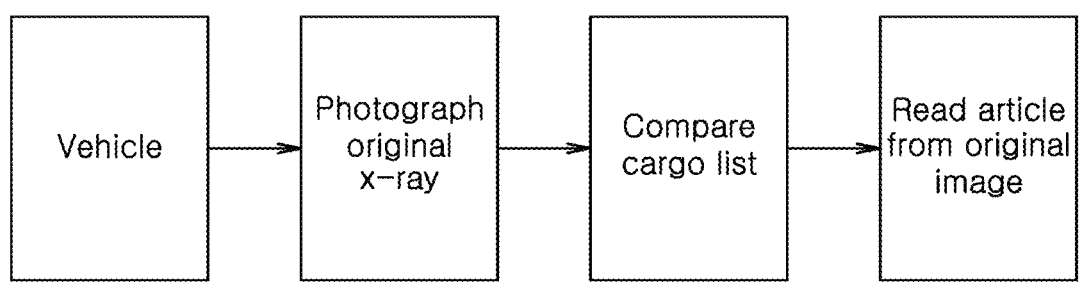
FIG. 1 is a schematic diagram of an X-RAY-based inspection method according to an embodiment in the related art.
Figure 2:
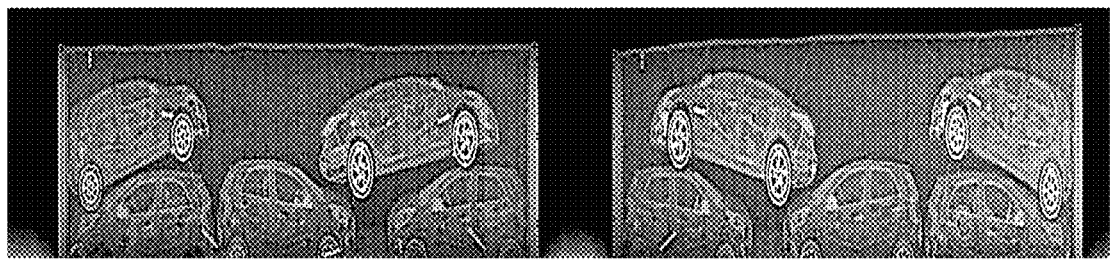
FIG. 2 is a diagram illustrating an image used in the inspection of FIG. 1.

In one example, the X-RAY photographing device is a type of fluoroscope and may transmit photographing information to an external computing device (e.g., a component 10, 20, 40, or 70) such as a compute such that the computing device may image-process the received photographing information and then generate an X-RAY image as illustrated in FIG. 2. In this case, the photographing information may be basic information for generating the transmitted or reflected image of FIG. 2 including a perspective result.

In another example, the X-RAY photographing device includes a processor, and may be further configured to generate an output image through image processing. Then, the X-RAY photographing device itself may generate an X-RAY image. In this case, the photographing information transmitted to the external computing device may be an X-RAY image.

Through such an X-RAY photographing device, the X-RAY image as illustrated in FIG. 2 is generally expressed as a monochrome or color image, and is displayed in brightness or color according to element symbols constituting the object to be photographed.

The X-RAY image may include one or more objects and backgrounds. The one or more objects may include an object to be read that a user wants to read.

The X-RAY photographing device may provide a target X-RAY image photographed by transmitting or reflecting X-rays in the reading space in which the object to be read is disposed, to other components (e.g., an image conversion unit or an article identification unit, etc.) of the X-RAY reading support system 1000.

The X-RAY reading support system 1000 is a computing device including a processor, and may include, for example, a laptop computer, a notebook computer, a smart phone, etc. A part or all of the X-RAY reading support system 1000 is configured to transmit/receive data to/from an external device through wired/wireless electric communication. In specific embodiments, the X-RAY reading support system 1000 (e.g., the interface unit 10) may be electrically connected to the X-RAY photographing device to directly receive photographing information of the X-RAY photographing device. Alternatively, in other specific embodiments, the X-RAY reading support system 1000 may indirectly receive photographing information of the X-RAY photographing device. In this case, the X-RAY reading support system 1000 may receive an X-RAY image of the X-RAY photographing device generated by another computing device.

The interface unit 10 is configured to acquire data from an external computing device or to acquire data by a user input. The interface unit 10 may also receive information on an object to be read.

The object to be read is an object that is desired to be read by the user and includes, for example, cargo loaded in a container, baggage scheduled to be shipped on an aircraft, etc. In addition, the object to be read is not limited to an object, and may include illegal immigrants or organisms such as animals to be quarantined. The X-RAY reading support system 1000 may apply a preset rule to the received object-related information to determine at least some of objects included in object-related information as the object to be read.

In one embodiment, the information on the object to be read may be information on the object to be read disposed in the reading space. In specific embodiments, the information on the object to be read may be list information consisting of one or more items. The list of this list information includes objects (hereinafter, referred to as "item objects") corresponding to one or more items.

When the object disposed in the reading space is cargo, the list information may be a list of articles arranged in the reading space. For example, the list of articles may be a cargo list (or a load list). In this case, the reading space may further include objects (e.g., cargo support parts) other than the cargo.

When the user is a customs officer, the articles loaded in the container are the objects to be read, and the cargo list submitted to the customs officer to have been loaded in the container is acquired as list information related to the object to be read.

In the embodiment, the list information, acquired as information on the object to be read by the interface unit 10, includes identification information of the item object. The identification information of the item object includes, for example, a name of the object (or a product name), a code (e.g., product code) provided by a creator of the object, or a code (e.g., customs code) provided by a government agency.

However, the information related to the object to be read is not limited thereto, and may include various pieces of information having information related to at least one of the objects arranged in the reading space.

To this end, the X-RAY image reading support system 1000 may be further configured to display a UI including a field for inputting a text representing the name of the object, a code related to the name, or the like. The X-RAY image reading support system 1000 may provide a UI for acquiring a cargo list, etc. to receive a user input of the cargo list through the interface unit 10 and acquire cargo list data based on the user's UI input.

For example, when the user inputs the cargo list, the X-RAY reading support system 1000 is configured to acquire a non-X-RAY image of one or more articles included in the received cargo list as a non-X-RAY image of the object to be read.

Hereinafter, for clarity of explanation, the information related to the object to be read is referred to as a cargo list, the reading space is referred to as a container in which the articles in the cargo list are arranged, and the object to be read is referred to as articles arranged in the container, and then the present invention will be described in more detail.

The image search unit 20 acquires a non-X-RAY image of articles in the cargo list based on information on the cargo list (e.g., acquired by the interface unit 10). The non-X-RAY image of the articles in the cargo list may represent a state in which the articles in the cargo list are arranged in the reading space, or may also represent a state in which the articles are not arranged.

In an embodiment, the non-X-RAY image may be a color image acquired using visible light. For example, the non-X-RAY image may be a majority of visible ray images searched when searching for a specific object on the Internet. However, the non-X-RAY image is not limited thereto and may be an image acquired using a wavelength different from the x-rays (e.g., ultraviolet rays), such as infrared rays.

When a cargo list includes multiple articles, a non-X-RAY image may be acquired for an individual article. For example, when the cargo list of the container includes a car and a truck, as illustrated in FIG. 4, a non-X-RAY image of the car having a background different from that of the container, and a non-X-RAY image of the truck may be acquired. In addition, when the cargo list of the container includes different cars (e.g., having different product names), the image search unit 20 may acquire a non-X-RAY image of each car.

In one embodiment, the image search unit 20 is configured to generate a search query based on the name of the object to be read included in the information on the object to be read, and transmit the search query to a web server to receive the searched image as a non-X-RAY image of the object to be read.

Some or all of the articles included in the cargo list received by the image search unit 20 are objects to be read. The image search unit 20 generates a search query for at least one article included in the cargo list. Then, the image search unit 20 transmits a search query to a web server (not illustrated).

The web server is connected to the X-RAY image reading support system 1000 via a network communication network. The network communication network may be configured regardless of its communication mode such as wired and/or wireless. In one embodiment, the network communication network may be a known World Wide Web (WWW).

The web server connected through the WWW is a server having a web page configured to be able to search for images, and may be an operating server of a portal site as an example. The web server performs a search in response to a search query of the image search unit 20 through a search engine executing a web page.

When the web server is connected through the WWW, the image search unit 20 generates a search query based on identification information (e.g., name or product code, etc.) of the article of the cargo list, and transmits the search query to the web server via the WWW.

In one embodiment, the image search unit 20 may also extract identification information such as the name of the article in the received cargo list or type information (e.g., a name of the type) of the article as the identification information of the object to be read, and generate a search query based on the extracted identification information of the object to be read.

Then, the web server may perform a web search operation of searching for a non-X-RAY image of the article (that is, the object to be read) of the search query in a non-X-RAY image stored in a database of the web server based on the search query received from the X-RAY image reading support system 1000 and transmitting the searched non-X-RAY image of the article to the X-RAY image reading support system 1000 in response to a search query. This web search operation, that is, the non-X-RAY image search through the WWW, may be performed as a searching process of acquiring an image by inputting a search word into a search engine, like searching an image the same as or similar to the corresponding object by inputting a text of the identification information such as a name text, a product code text or a type text of the object itself included in the cargo list to a search portal.

In addition, the X-RAY image reading support system 1000 may be further configured to modify a product-related expression in the cargo list in order to increase the efficiency of the search, after acquiring a text such as a name of the item object in the cargo list. In an embodiment, the X-RAY image reading support system 1000 may add an additional search condition to the expression of the object name. The additional search condition includes an attribute of the non-X-RAY image. The image attribute includes various image attributes including, for example, a viewer condition such as a 'side image' and/or a resolution condition such as a 'resolution size.'

In another embodiment, the network communication network may be a local network. In this case, the web server is configured to pre-build one or more non-X-RAY images each associated with a plurality of objects. In addition, the X-RAY image reading support system 1000 generates a search query according to a protocol pre-specified for the local network, and transmits the search query to a web server through the local network.

The image conversion unit 40 converts the searched non-X-RAY image of the article in the cargo list into a fake X-RAY image that is difficult to be distinguished from a real X-RAY image. Here, the real X-RAY image represents an image to be acquired when the photographed object is directly photographed by the X-RAY photographing device. The image to be directly photographed when the inside of the container including the article is photographed may be the real X-RAY image. The fake X-RAY image has characteristics of the X-RAY image same as or similar to the real X-RAY image, but is not an image directly photographed by the X-RAY photographing device.

In an embodiment, the image conversion unit 40 may calculate segmentation information of the non-X-RAY image by segmenting the article in the cargo list included in the searched non-X-RAY image into segments. The image conversion unit 40 generates a fake X-RAY image based on the segmentation information of the searched non-X-RAY image.

Almost all of the images searched through a search engine are not configured to include only objects. The searched image includes a combination of the corresponding object and a background, or a combination of the corresponding object, another object, and a background.

The image conversion unit 40 is configured to extract features from the image and segment the object included in the image into segments. In specific embodiments, the image conversion unit 40 may include a segmentation model that segments an object from an input image.

The segmentation model is configured to label each pixel included in the image with a corresponding class. The class includes, for example, an object such as a car or a part of the object, such as a wheel or a body of the car. The number of classes to be labeled by the segmentation model is set depending on the number of subsets included in a learning data set of the segmentation model.

In one embodiment, the segmentation model is learned through multiple learning samples. Each learning sample includes a non-X-RAY image of a candidate object to be read and segment information in the non-X-RAY image.

The segmentation model may have a variety of network architectures including convolutional filters and the like.

The segmentation model may be configured based on, for example, fully convolutional networks (FCN), SegNet, and DeepLab structures.

The image conversion unit 40 may calculate segmentation information by labeling each pixel included in the non-X-RAY image searched by the segmentation model with a corresponding class and segmenting the labeled pixels into one or more segments. The segmentation information includes boundary and/or location information of the segment in an input image (e.g., a searched non-X-RAY image). When the segmentation information is imaged, an image in which only the segmented object is expressed in the input image may be implemented.

Due to the location and/or boundary of the segment acquired according to such a segmenting process, an area of the article in the cargo list included in the searched image may be converted into an image more efficiently.

Also, the image conversion unit 40 may remove a background from a searched image through the segmenting process. In the image from which the background has been removed, the existing background area may be, for example, processed in black, but is not limited thereto, and may be processed in a different color (e.g., white). In the image from which the background has been removed, an object (e.g., an article in the cargo list) may be configured with at least one segment) may be configured. For example, when the article in the cargo list is a car, a wheel is segmented into a first segment, a body is segmented into a second segment, and a window is segmented into a third segment, and the article in the cargo list may include three segments. In some embodiments, the image conversion unit 40 may be further configured to provide a UI that induces a user to confirm the image from which the background has been removed. In this case, the image conversion unit 40 may be further configured to set a background area from the image and remove the set area according to a user input.

Additionally, the image conversion unit 40 may calculate segmentation information to implement a displayed image to indicate a label associated with each pixel in a non-X-RAY image of the article in the cargo list.

In addition, the image conversion unit 40 may generate segment characteristic information for a segment generated due to segmentation. In this case, the segmentation information further includes segment characteristic information.

In one embodiment, the characteristic information of the segment is generated based on the cargo list. The characteristic information of the segment includes a product characteristic of cargo that is difficult to be derived from the non-X-RAY image by the segmentation process, but may affect the reading of the X-RAY image (e.g., causing an error).

For example, in the case of a product such as a car, a body, lights, tires, wheels, windows, and the like are segmented and used as segment characteristic information.

In addition, the image conversion unit 40 may also calculate an outline area of the article in the cargo list in the searched non-X-RAY area.

In an embodiment, the image conversion unit 40 may calculate an outline area of a segment from the segmentation information. Since the segmentation information includes boundary information and/or location information of a segment corresponding to the article in the cargo list, the image conversion unit 40 may calculate an area consisting of the boundary of the segment as an outline area of the article in the cargo list of the non-X-RAY image based on the boundary information and/or location information.

In an embodiment, the image conversion unit 40 may randomly arrange the segmented segments at one or more different locations. Then, segmentation information including a segment of an object placed at an original location in the existing image (e.g., the searched non-X-RAY image); and other segments including some or all of the objects, which are randomly arranged at different locations, may be generated.

The size and/or location of the image in which the segments are arranged may be based on the size of an arbitrary X-RAY image below. For example, even when a non-X-RAY image including a single object is searched, the single object is randomly disposed within the size of the arbitrary X-RAY image as illustrated in FIG. 4. Then, an outline area for a plurality of single objects may be calculated.

The segmentation information further including the randomly arranged segments is applied to an image conversion model below.

The image conversion unit 40 may calculate texture information from the arbitrary X-RAY image. The arbitrary X-RAY image may be a background image suitable for arranging a segment corresponding to an article in the cargo list.

In an embodiment, the arbitrary X-RAY image from which the texture information is calculated may be a real X-RAY image of the reading space. The image conversion unit 40 may calculate texture information from an X-RAY image of a reading space (e.g., a container) pre-stored in the X-RAY image reading support system 1000.

The image conversion unit 40 may use an X-RAY image including an article different from the article to be read to calculate the texture information of the X-RAY image.

The image conversion unit 40 may also calculate texture information from an image by, for example, a local binary pattern (LBP), a Sobel Edge Filter (SEF) (also referred to as a Sobel Edge Detector), or Local ThresHolding (LTH), but is not limited thereto, and may also calculate texture information using various other texture extraction algorithms.

When an object in the arbitrary X-RAY image is included in the texture information of the arbitrary X-RAY image, the image conversion unit 40 may calculate a texture map by removing the outline area of the object from the texture information. The object may be an object which is not included in the cargo list.

When the arbitrary X-RAY image includes the object, the texture information includes a texture of the background and a texture of the object (e.g., an article to be read or another article). Then, the texture information still includes information about an approximate shape of an individual object.

In order to remove a texture component of the object of the arbitrary X-RAY image, an outline area of the object in the arbitrary X-RAY image is removed from the texture information. Then, a texture map consisting of a background texture of the arbitrary X-RAY image is calculated.

In addition, in specific embodiments, the image conversion unit 40 may calculate texture information by using an X-RAY image without an article in the container as the arbitrary X-RAY image. In this case, the texture information is directly used as the texture map.

The image conversion unit 40 may generate a composite image by combining the texture map and the segmentation information. For example, as illustrated in FIG. 4, the texture map may be used as a background image, and segments of the segmentation information may overlap with the background image to generate a composite image.

In one embodiment, the composite image is generated by combining the texture map from the arbitrary X-RAY image with the outline area from the searched non-X-RAY image. Then, it is possible to generate a composite image in which the texture component of the X-RAY image is used as a background and the outline shape of an unlimited range of the article is combined.

The image conversion unit 40 includes an image conversion model pre-learned to output a fake X-RAY image of the article in the cargo list.

The fake X-RAY image of the article in the cargo list output by the image conversion model is an image corresponding to the real X-RAY image of the article in the cargo list which is directly photographed by the X-RAY photographing device in the background of the arbitrary X-RAY image. The fake X-RAY image may also be the same as or very similar to the real X-RAY image described above.

When an image including an object area as an image to be photographed and a background image are input to the image conversion model, the entire X-RAY image consisting of the corresponding object and the background is output.

The image conversion model is a machine learning model that generates an image based on input data, and has an image generation structure including, for example, an auto-encoder (AE), a variational auto-encoder (VAE), a generative adversarial network (GAN), etc.

Figure 5:
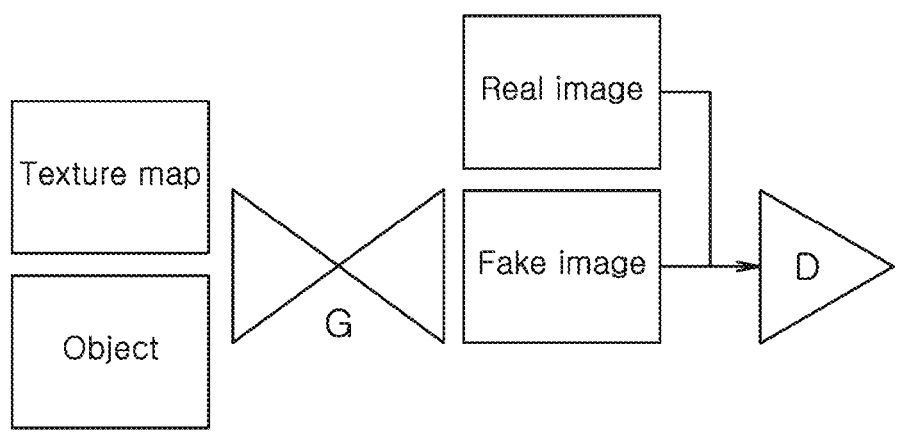
FIG. 5 is a schematic network architecture diagram of an image conversion model according to an embodiment of the present invention.

FIG. 5 is a schematic network architecture diagram of an image conversion model according to an embodiment of the present invention.

Referring to FIG. 5, an image conversion model may be configured based on a GAN. The GAN structure includes a generator and a discriminator. The generator is configured to output new data by applying noise to the input data.

In specific embodiments, the image conversion model may be a generator in the GAN structure. The generator may have an encoder-decoder structure using skip connection.

In an embodiment, as illustrated in FIG. 5, both segmentation information (or an outline area) and a texture map may be input to the generator operating as an image conversion model. In another embodiment, a composite image based on the segmentation information (or outline area) and the texture map may also be input to the generator.

The image conversion model may be learned by interacting with another machine learning model. For example, the image conversion model may be learned to output a fake X-RAY image of an input image by interacting with a discriminator (D) of the GAN structure.

The generator aims to deceive the discriminator by generating data close to the real data such that the discriminator discriminate the close data as real data. The discriminator aims to identify the real data from output data of the generator. For example, the generator aims to generate a fake X-RAY image close to the real X-RAY image of the object, and the discriminator aims to discriminate the fake X-RAY image output by the generator from the real X-RAY image acquired by directly photographing the object. The image conversion model is learned by a first training data set including a plurality of first training samples.

In one embodiment, each of the plurality of first training samples may include an X-RAY image of each first training object, segmentation information (or outline area) of a real X-RAY image of the first training object, and a texture map of the real X-RAY image of the first training object, respectively, or may also include a real X-RAY image of the first training object and a composite image based on segmentation information of the real X-RAY image of the first training object and a texture map, respectively. The composite image is generated by combining a texture map of the real X-RAY image of the first training object, the segmentation information (or outline area), and the texture map.

Figure 6:
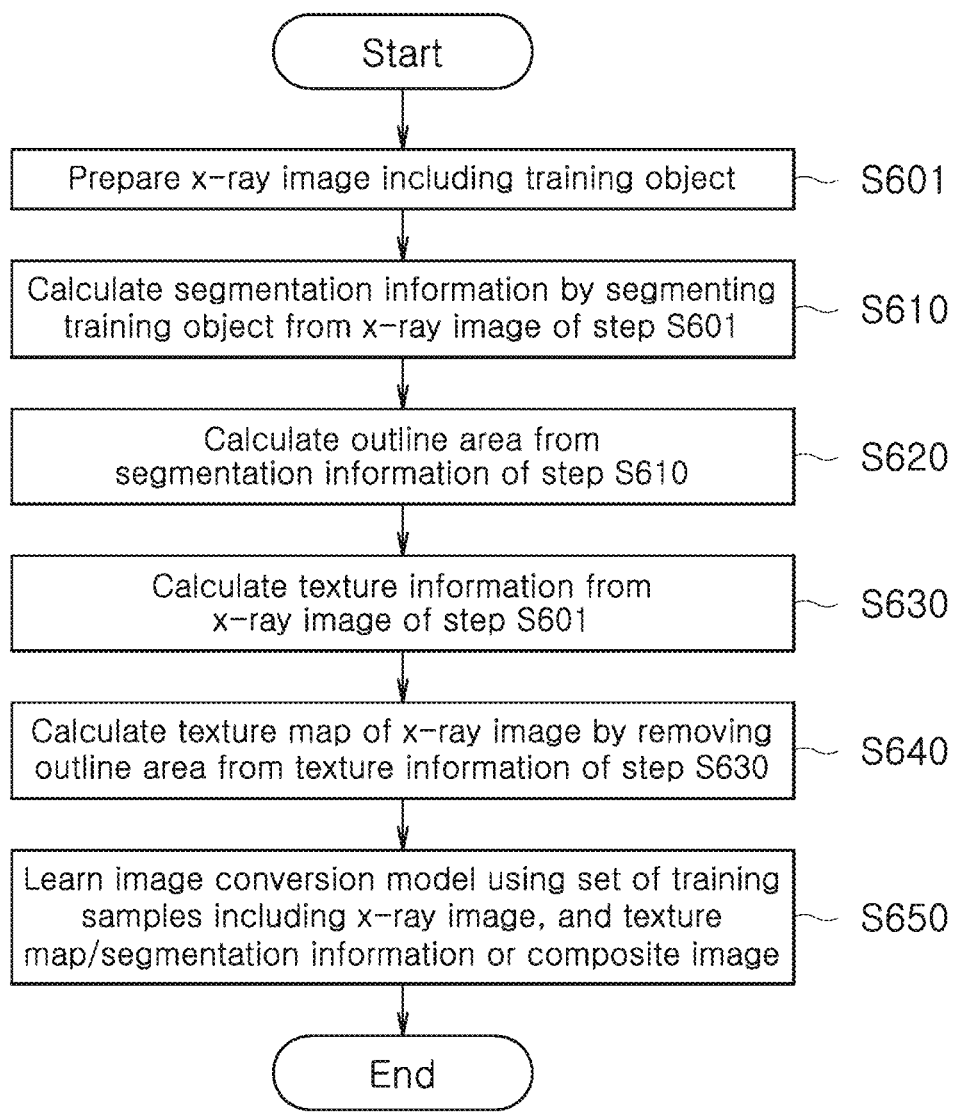
FIG. 6 is a flowchart of a process of generating a first training data set used to learn an image conversion model according to an embodiment of the present invention.
Figure 7:
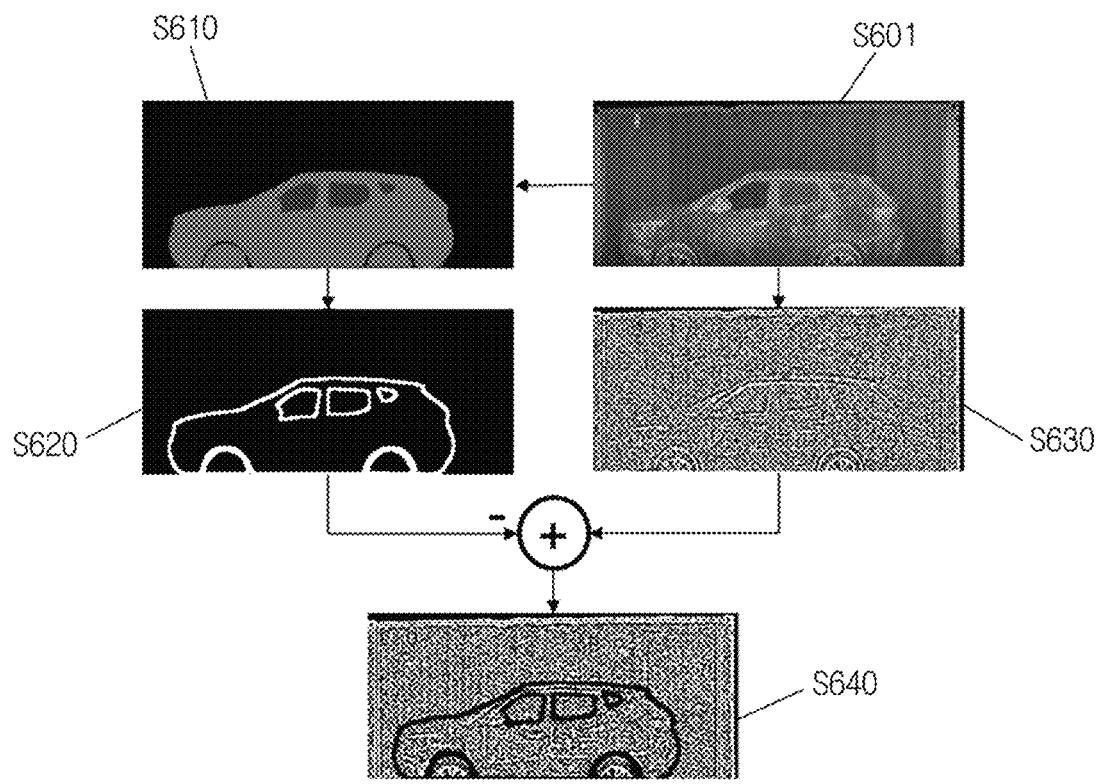
FIG. 7 is a diagram illustrating a step-by-step processing result of FIG. 6 as an image.

FIG. 6 is a flowchart of a process of generating a first training data set used to learn an image conversion model according to an embodiment of the present invention, and FIG. 7 is a diagram illustrating a step-by-step processing result of FIG. 6 as an image.

Referring to FIGS. 6 and 7, in order to learn an image conversion model, first, an X-RAY image including a first training object is prepared (S601). A plurality of X-ray images for training may be received from an external device to be prepared for learning. For example, as illustrated in FIG. 7, an X-RAY image including a car as a first training object is prepared (S601).

The learning process includes calculating segmentation information by segmenting the first training object included in the X-RAY image of step S601 into segments in the X-RAY image (S610). When the prepared X-RAY image of the first training object is segmented into one or more segments, an object or a part of the object included in a non-X-RAY image of the first training object may be labeled as segments to calculate segmentation information. The segmentation information includes location and/or boundary information of the segments. As illustrated in FIG. 7, the image of the segmentation information is implemented as an image in which the first training object is expressed as segments. Since step S610 is similar to the operation of calculating the segmentation information performed by the image conversion unit 40, detailed description thereof will be omitted.

The learning process includes calculating an outline area of the first training object from the segmentation information of step S610 (S620). As illustrated in FIG. 7, the outline area is implemented as an image in which the outline of the first training object is shaped. Since step S620 is similar to an operation of calculating the outline area of the object (i.e., article) to be read from the segmentation information performed by the image conversion unit 40, a detailed description thereof will be omitted.

The learning process includes calculating texture information from the X-RAY image of step S601 (S630). The texture information includes a texture component of the background and a texture component of the object. As illustrated in FIG. 7, the image of the texture information is implemented as an image including the texture component of the background and the texture component of the first training object. Since step S630 is similar to the operation of calculating the texture information from the arbitrary X-RAY image, which is performed by the image conversion unit 40, a detailed description thereof will be omitted.

The learning process includes calculating a texture map of the X-RAY image of step S601 by removing the outline area from the texture information of step S630 (S640). The area of the texture component of the first training object is formed to be the same as or similar to the outline area of step S620. This is because the outline area and the texture information are calculated from the same X-RAY image including the same first training object. Accordingly, when the outline area of the first training object is removed from the texture information, the texture component of the first training object included in the texture information is removed, and eventually, a texture map consisting of the texture component of the background is acquired from the X-RAY image of step S601.

By steps S601 to S640 described above, a set of first training samples including a real X-RAY image of the first training object, segmentation information (or outline area) of the real X-RAY image of the first training object, and a texture map of the real X-RAY image of the first training object, respectively, is generated. Alternatively, a set of first training samples including a real X-RAY image of an individual first training object and a composite image based thereon, respectively, is generated.

As described above, the purpose of separately using the segments of the texture map and the segmentation information is because the network of the image conversion model is desired to learn shape information of an object (e.g., a vehicle) from the segmentation information and texture information from the texture map. When the texture map includes information on the shape of the vehicle as illustrated in FIG. 7, the network of the image conversion model may learn important information about the shape from the texture map, not from the segmentation information, and as a result, the efficiency in learning the shape from the segmentation information is deteriorated. Therefore, in step S640, shape information (i.e., an outline area) of the object is removed from the texture map using a morphological operation.

Through this first training sample set, the image conversion model is learned to convert the background and the object into an X-RAY image at the same time using the segment information (e.g., label information) of the area of the first training object and the texture information of the background area based on the real X-RAY image, the segmentation information, the texture map, and the composite image of the object (S650).

When learning proceeds in step S650, the generator and the discriminator update parameters in the model to achieve respective goals. The discriminator is learned to reduce a probability of making a mistake, and the generator is learned to increase a probability of the discriminator making a mistake with respect to data output from random noise. That is, the generator and the discriminator are learned to solve a minimax problem.

In general, when only segments are considered in a loss function for solving the minimax problem in the GAN model, the learning process is performed in a direction of minimizing the loss function, which is expressed by the following Equation.

$$G^* = \underset{G}{\arg\min}\underset{D}{\max} L_c(G, D) + \lambda L_1(G) \quad \text{[Equation 1]}$$

Lc and L1 in Equation 1 are expressed by the following Equations.

$$L_c(G,D)=E[\log D(x,y)]+E[\log(1-D(x,G(x,z)))] \quad \text{[Equation 2]}$$

$$L_1(G)=E[\|y-G(x,z)\|_1] \quad \text{[Equation 3]}$$

Here, G represents a generator, D represents a discriminator, y represents a real background image, z represents noise of the generator (e.g., latent noise), and λ represents a balance parameter in the GAN structure, respectively.

However, Equations 2 and 3, which are the basis of the loss function of Equation 1 above, are functions considering the importance of the texture in the training image relatively lower than the importance of the object (i.e., segments), like a non-X-RAY image.

In an embodiment, the image conversion model may also be learned in a direction of minimizing the loss function of Equation 1 above. Lc and L1 in Equation 1 are replaced with the following Equations 4 and 5.

$$L_c(G,D)=E[\log D(x,y)]+E[\log(1-D(x,G(x,t,z)))] \quad \text{[Equation 4]}$$

$$L_1(G)=E[\|y-G(x,t,z)\|_1] \quad \text{[Equation 5]}$$

Here, t is an extracted texture map (or texture information), which is extracted from the real X-RAY image of the first training object in step S601 for learning. As such, since the learning uses the loss function considering the texture of the training image, an image analysis model as the generator and a discriminator interacting therewith are learned by considering the texture.

In this learning process (S670), the discriminator receives feedback from a correct answer (i.e., training data) of an input value, and the generator receives feedback from the discriminator. The generator, which has been sufficiently learned and completed, is updated to output data as close as possible to the input data, and the learning is eventually completed. Here, the close data means that probability distributions followed by the two data are similar to each other (for example, a difference between the probability distributions of the two data is equal to or less than a predetermined threshold).

The image conversion unit 40 may generate a fake X-RAY image of the article in the cargo list by applying the segmentation information (or outline area) of the article in the cargo list and the texture map of the container photographed image as an arbitrary X-RAY image to the reading model learned using the training data set of FIG. 6. Then, a non-X-RAY image of the article in the searched cargo list is converted into a fake X-RAY image that is the same as or very similar to the real X-RAY image of the article in the cargo list.

The image conversion unit 40 may provide a fake X-RAY image of the article in the cargo list to the article discrimination unit 60.

The article discrimination unit 60 is configured to identify an object to be read from a target X-RAY image photographed by the X-RAY photographing device.

In an embodiment, the article discrimination unit 60 may include a reading model for extracting features from the input image. The reading model is configured to include: a feature extraction portion for extracting features from the input image; and a classification portion for classifying the object of the input image into a corresponding class based on the extracted features.

The class is set based on a training data set used to learn to identify the object of the input image. The training data set may be sub-set for each class.

The reading model may be configured as a structure of various machine learning models that classify the input image (or the object of the input image). The reading model may be configured in a structure based on, for example, an artificial neural network (NN) or a convolution neural network (CNN), but is not limited thereto. When the reading model is configured in a CNN-based structure, the feature extraction portion may include a convolutional layer, and the classification portion may include a complete connection layer.

In one embodiment, the reading model is a machine learning model learned using a second training data set including a plurality of second training samples. The second training data set may be sub-set into individual objects, and a class corresponding to the individual object may be generated as a result of learning. Then, the object of the input image is classified into a class corresponding to the individual object through the classification portion.

Each of the plurality of second training samples may each include a real X-RAY image of the second training object and/or a fake X-RAY image of the second training object. For example, the second training sample may include a real X-RAY image acquired by actually photographing a second training object for learning of the reading model. Alternatively, the second training sample may include a fake X-RAY image of the second training object. Alternatively, the second training sample may include a real X-RAY image and a fake X-RAY image of the second training object.

In addition, in some embodiments, each of the plurality of second training samples may further include information (e.g., object information, etc.) on the included image. For example, the second training sample may include a fake X-RAY image of a car and information that an object in the fake X-RAY image is a car.

As such, since the second training data set further includes the fake X-RAY image unlike the first training data set, more individual objects may be learned.

Figure 8:
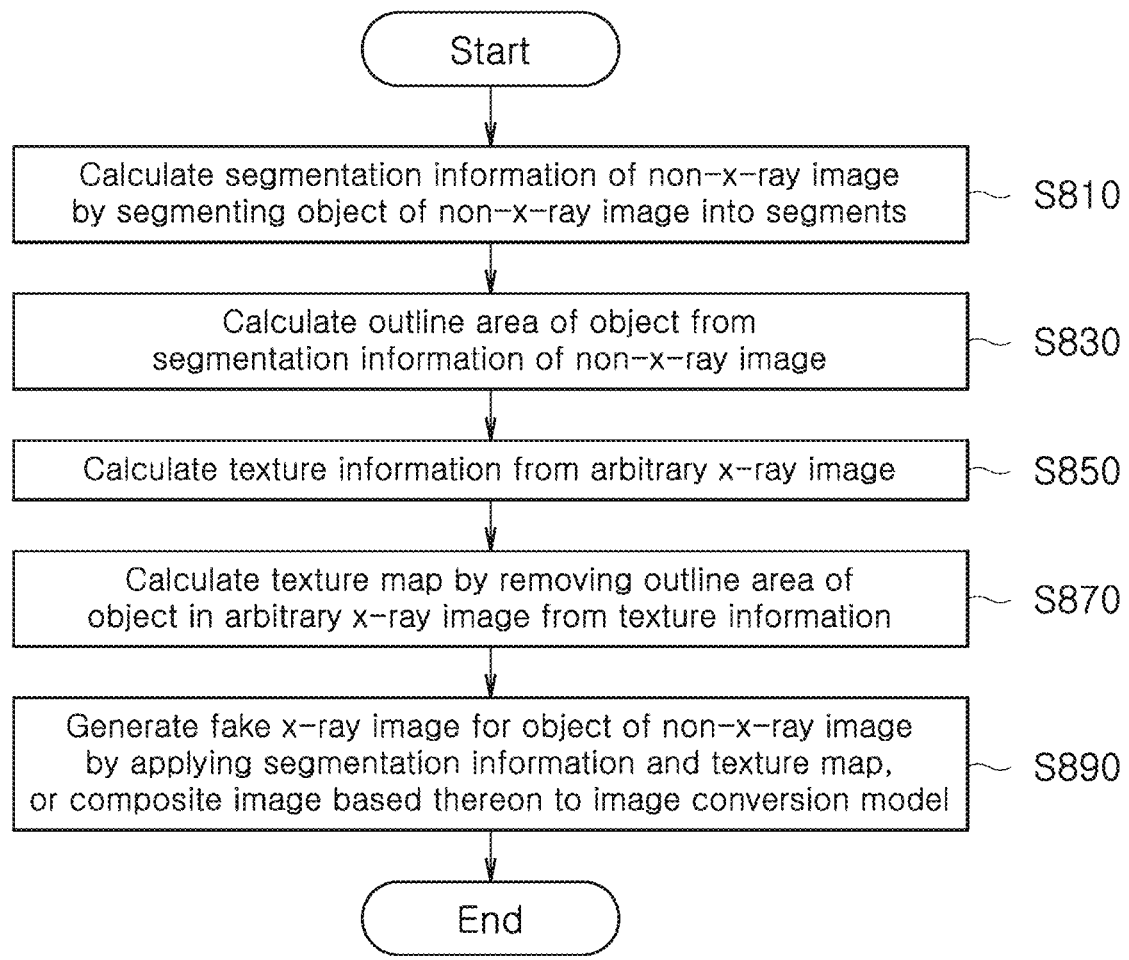
FIG. 8 is a flowchart of a process of generating a second training data set used to learn a reading model according to an embodiment of the present invention.

FIG. 8 is a flowchart of a process of generating a second training data set used to learn a reading model according to an embodiment of the present invention.

Since steps S810 to S890 of FIG. 8 are similar to the operation of converting a non-X-RAY image into a fake X-RAY image, which is performed by the image conversion unit 40, differences will be mainly described.

Referring to FIG. 8, the process of generating the fake X-RAY image used to learn the reading model includes calculating segmentation information by segmenting the second training object into segments in the non-X-RAY image of the second training object (S810). In some embodiments, a non-X-RAY image intended by the user may be directly prepared. Alternatively, in some embodiments, the non-X-RAY image intended by the user may be indirectly prepared. For example, if the user inputs some information (e.g., a name, etc.) required to generate a search query for an object, the non-X-RAY image of the corresponding object may also be prepared as a non-X-RAY image of the training object based on the search query.

In step S810, the segment is formed as an area or a partial are of the first training object, and the segmentation information may include at least one of boundary and location information of the segment in the image.

In an embodiment, the segmentation information may be calculated by a segment model. The segment model is learned to label an object as segments in the non-X-RAY image.

Further, the process of FIG. 8 includes calculating an outline area of the second training object from the segmentation information (S830).

Further, the process of FIG. 8 includes calculating a texture map from an arbitrary X-RAY image (S850). The arbitrary X-RAY image is a real X-RAY image photographing a space in which the object to be read identified in the reading model can be disposed. In one embodiment, the arbitrary X-RAY image includes a real X-RAY image of a background on which the target X-RAY image is photographed, that is, a reading space. Then, the reading model learns the reading space as a background.

In an embodiment, step S850 includes a step of calculating texture information from the arbitrary X-RAY image.

When the arbitrary X-RAY image does not include an object but includes a background, the texture information is used as a texture map.

When the arbitrary X-RAY image includes an object, step S850 includes steps of calculating an outline area of the object in the arbitrary X-RAY image from the texture information of the arbitrary X-RAY image; and calculating a texture map by removing the outline area of the object in the arbitrary X-RAY image from the texture information. The object in the arbitrary X-RAY image may be arranged in the reading space. For example, the object in the arbitrary X-RAY image may be the same as or different from the article in the cargo list.

In addition, the process of FIG. 8 includes generating a fake X-RAY image of the second training object by applying the segmentation information of the second training object and the texture map of the arbitrary X-RAY image in step S830 to an image conversion model (S870).

In an embodiment, the segmentation information in step S830 and the texture map in step S850 may be input to the image conversion model.

In another embodiment, a composite image may also be input in the image conversion model based on the segmentation information in step S830 and the texture map in step S850.

The fake X-RAY image of the second training object to be used to learn the reading model is generated by steps S810 to S870 of FIG. 8.

Figure 9:
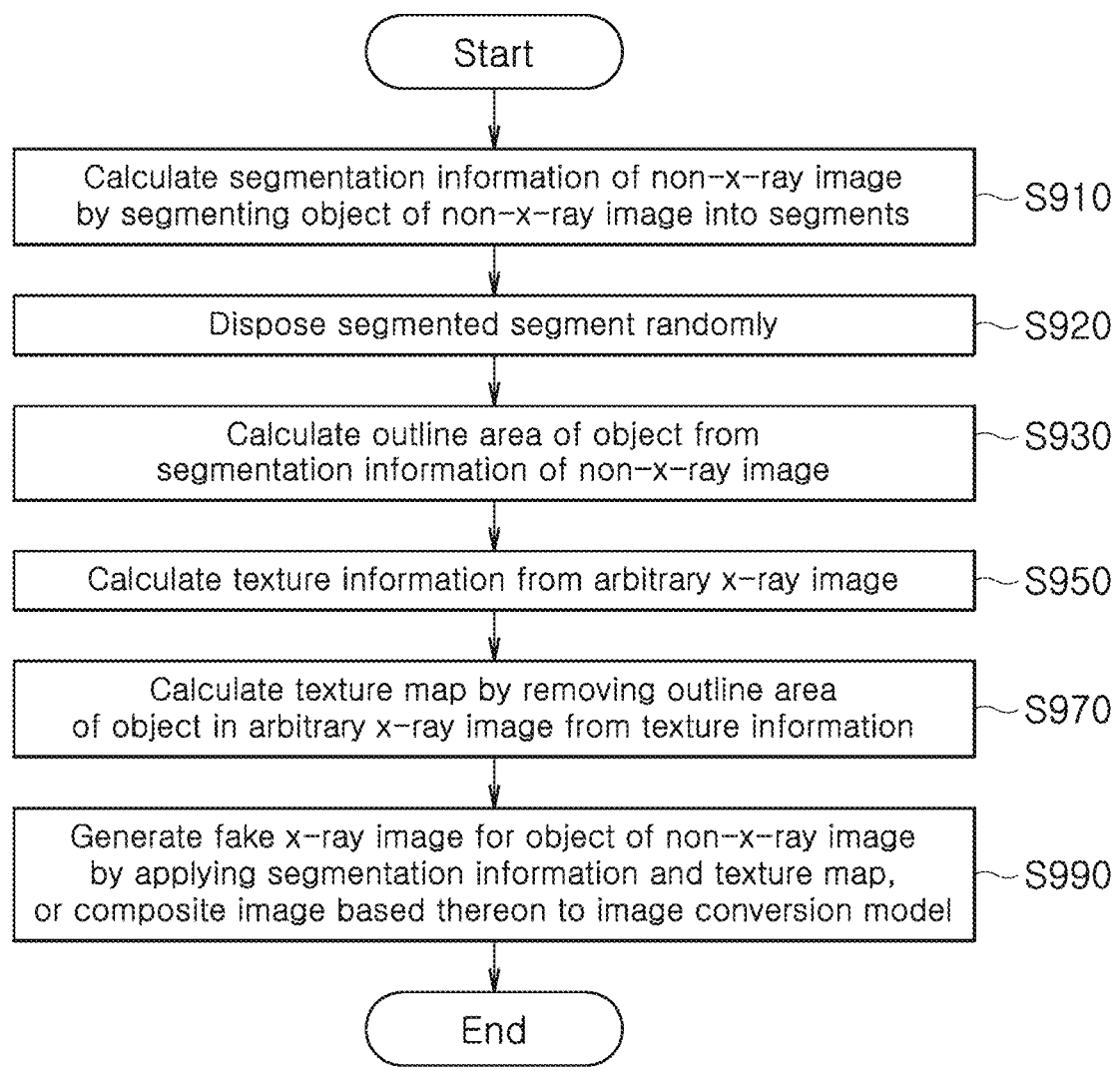
FIG. 9 is a flowchart of a process of generating a second training data set used to learn a reading model according to another embodiment of the present invention.

FIG. 9 is a flowchart of a process of generating a second training data set used to learn a reading model according to another embodiment of the present invention.

Since steps S910 to S990 of FIG. 9 are similar to steps S810 to S890 of FIG. 8, the differences will be mainly described.

A process of FIG. 9 includes randomly arranging segments of segmentation information of step S910 at one or more different locations (S920).

Then, the segmentation information used to calculate the outline area in step S930 includes a segment disposed at an original location and a segment randomly disposed at another location in the non-X-RAY image. The outline area calculated in step S930 includes an outline area of an object in step S910 and an outline area of an object additionally randomly arranged in step S920. Since steps S950 to S990 are similar to steps S850 to S850, detailed descriptions thereof will be omitted.

As such, according to the embodiment of FIG. 9, a reading model may learn an identification operation even for a large number of images arranged in a corresponding space from a non-X-RAY image in which a single object or few objects are photographed.

When a fake X-RAY image of the second training object generated by the processes of FIGS. 8 and 9 is used for learning of the reading model, there are the following advantages compared to the reading model learned using only the real X-RAY image: a) There is no need to prepare an X-RAY image for training by actually photographing a training object every time with an X-RAY imaging device, and b) in practice, it is possible to learn an unlimited range of objects. This is because ability to identify an object in the X-RAY image of the reading model is learned using an X-RAY image generated from a web-based non-X-RAY image such as Internet search. In addition, c) object identification ability may be learned in consideration of various locations in the X-RAY image. This is because, as illustrated in FIG. 9, it is possible to learn the ability using segmentation information in which segmented segments are randomly arranged.

The article discrimination unit 60 may identify the corresponding article from a real X-RAY image (hereinafter, referred to as a target X-RAY image) of the article as an object to be read, which is photographed by the X-RAY photographing device, using the reading model learned using the above-described second training data set.

In an embodiment, the article discrimination unit 60 may extract a first feature set by applying the target X-RAY image to the reading model. The first feature set (e.g., a feature vector or a feature map) consists of features extracted from the target X-RAY image, wherein the features are features that describe an object to be read expressed in the target X-RAY image. The first feature set is extracted by a feature extraction portion of the reading model.

When the object to be read is classified as a set class based on the first feature set extracted from the target X-RAY image, the article discrimination unit 60 is further configured to identify the object to be read as an object corresponding to the classified class. The classification operation is performed by the classification part of the reading model. When the second training data set includes an image of a training object corresponding to the object to be read, the object to be read may be immediately identified by the reading model.

The second training data set may not include the image of the training object corresponding to the object to be read, or the number of images of the object to be read may be relatively insufficient, so that the ability of classifying the object to be read may be poorly learned. Then, instead of determining a class to which the object to be read in the target X-RAY image belongs, the reading model may determine that the object to be read is not classified as a class.

Then, the article discrimination unit 60 is further configured to identify the object to be read by determining which article in the cargo list the photographed object to be read is matched with, using list information (e.g., a cargo list) associated with the object to be read.

To this end, the article discrimination unit 60 may extract a second feature set by applying a fake X-RAY image of the article in the cargo list to the reading model. The second feature set is extracted by the feature extraction portion of the reading model.

The article discrimination unit 60 compares the first feature set extracted from the target X-RAY image of the photographed article with the second feature set extracted from the fake X-RAY image of the article in the cargo list to read whether the photographed article is an article belonging to the cargo list.

The article discrimination unit 60 may calculate the similarity between the first feature set and the second feature set through various similarity comparison algorithms.

For example, the article discrimination unit 60 may calculate similarity between the first feature set and the second feature set through a Euclidian distance, a cosine distance, a Mahalanobis distance, or a joint Bayesian.

When the calculated similarity is equal to or greater than a preset threshold, the article discrimination unit 60 determines that the photographed article matches the article in the cargo list, and reads the photographed article as a matching article in the cargo list.

When there are a plurality of articles in the cargo list, the article discrimination unit 60 may pre-calculate a plurality of second feature sets for a plurality of articles in the cargo list, respectively, and may compare the pre-calculated second feature sets with the first feature sets of the photographed article, respectively. The comparison between the single first feature set and the plurality of second feature sets may be performed sequentially (e.g., according to the order of the articles in the cargo list).

As such, the X-RAY reading support system 1000 itself may perform a reading operation of detecting whether there is an object to be read corresponding to cargo included in the cargo list among objects shown on the target X-RAY image. It is also possible to provide the read result to the user. For this reason, the X-RAY reading support system 1000 may support a task of reading a target X-RAY image, which has been manually performed by the user in the related art, through the above-described image conversion operation and article reading operation, etc.

The image conversion model, the segmentation model, and/or the reading model may be models generated by the X-RAY reading support system 1000. To this end, the X-RAY reading support system 1000 may further include a learning unit (not illustrated) that models the image conversion model, the segmentation model, and/or the reading model. Alternatively, the image conversion model may be a model generated by an external component of the X-RAY reading support system 1000. In this case, the image conversion model may be used to receive and store in the X-RAY reading support system 1000 before the conversion operation an image conversion model pre-generated by a remotely located external computing device, and to generate an X-RAY image. To this end, the X-RAY reading support system 1000 may further include a storage device (not illustrated) for storing the image conversion model. The storage device may be configured by including at least one of a volatile memory (not illustrated), a nonvolatile memory (not illustrated), and an external memory (not illustrated). For example, the volatile memory may be either a random access memory (RAM) or a dynamic random access memory such as synchronous DRAM (SDRAM), double data rate (DDR) SDRAM, or Rambus DRAM (RDRAM). In addition, the nonvolatile memory may be any one of a read-only memory (ROM) and a flash memory, and the external memory may be any one of MMC type, SD type, and CF type memory cards.

In one embodiment, the X-RAY reading support system 1000 may store a pre-learned model in the nonvolatile memory so as to utilize a pre-learned model in a nonvolatile memory in which stored data is not lost even if a reset is performed due to a power supply cutoff, etc. even after power supply is started again.

It will be apparent to those skilled in the art that the X-RAY reading support system 1000 or some components may include other components not described herein. For example, the X-RAY reading support system 1000 may include other hardware elements required for the operations described herein, including a network interface, an input device for data entry, a memory for storing data, and an output device for displaying, printing or displaying other data.

An X-RAY image reading support method according to another aspect of the present invention is performed by a computing device including a processor. The computing device including the processor may include, for example, the X-RAY reading support system 1000 or some components or other computing devices. Hereinafter, for clarity of explanation, the present invention will be described in more detail with embodiments in which the X-RAY image reading support method is performed by the X-RAY reading support system 1000.

Figure 10:
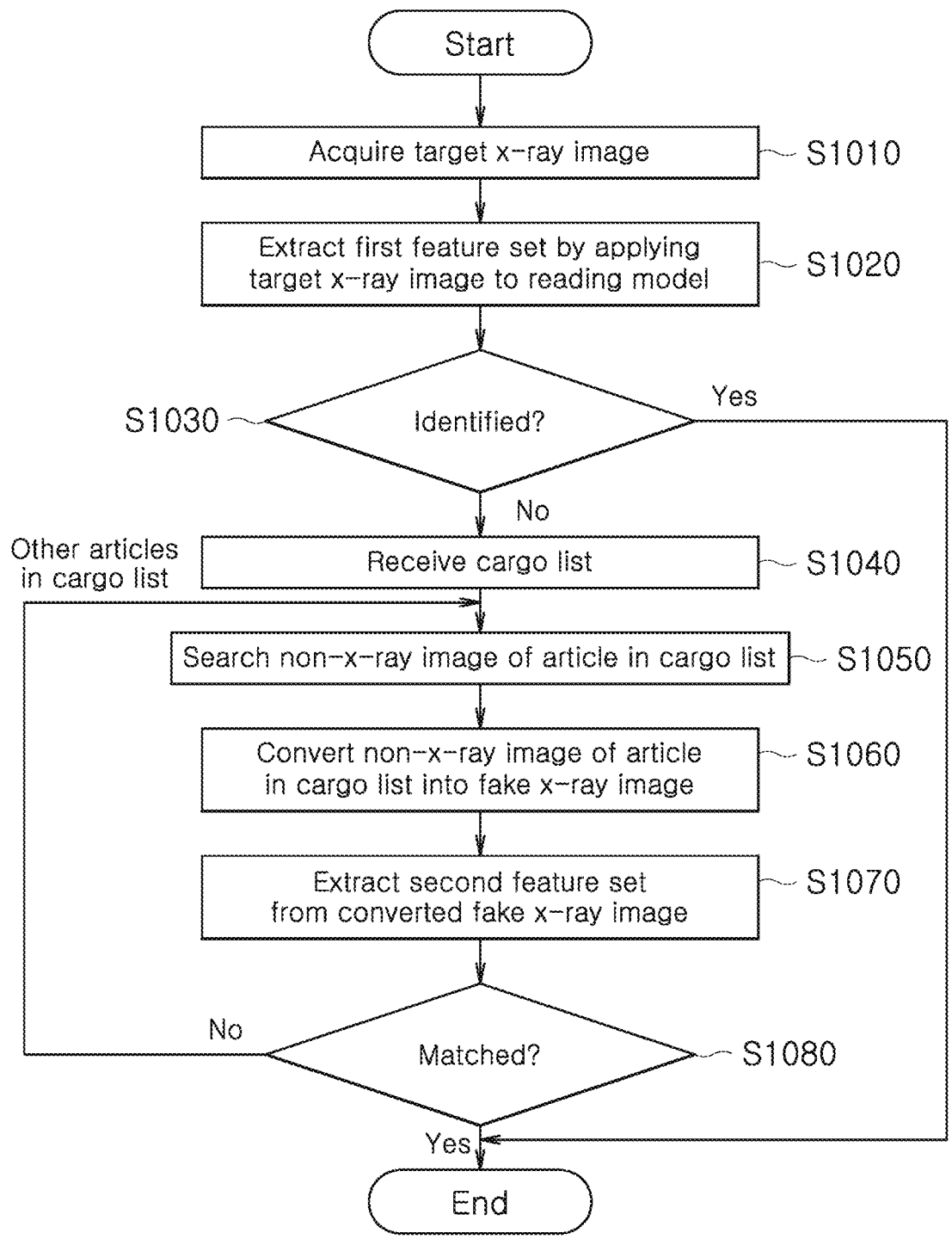
FIG. 10 is a flowchart of an X-RAY image reading support method according to an embodiment of the present invention.

FIG. 10 is a flowchart of an X-RAY image reading support method according to an embodiment of the present invention.

Since steps of FIG. 10 are similar to the operations of the components of the X-RAY reading support system 1000, detailed descriptions thereof will be omitted.

The X-RAY image reading support method includes the steps of: acquiring a target X-RAY image photographed by transmitting or reflecting X-rays in a reading space in which an object to be read is disposed (S1010); and applying the target X-RAY image to a reading model that extracts features from an input image (S1020).

The reading model, as described above, is a machine learning model learned using a second training data set consisting of a plurality of second training samples, wherein the second training data set is sub-set into individual objects. Each of the plurality of second training samples may include a real X-RAY image of the second training object and/or a fake X-RAY image of the second training object. The fake X-RAY image of the second training object used to learn the reading model is generated by the process of FIG. 8 or 9.

In step S1020, a first feature set to be read is extracted.

When the reading model classifies the object to be read into a preset class, the object to be read is identified as an object corresponding to the class (S1030).

If the class of the object to be read is not determined by the reading model, the object to be read is identified by determining whether the object to be read matches an item object in the list information related to the object to be read.

In one embodiment, the X-RAY image reading support method may further include the steps of: receiving list information including one or more object items related to the object to be read (S1040); acquiring a non-X-RAY image of the item object in the list related to the object to be read based on the list information (S1050); converting a non-X-RAY image of the item object in the list into a fake X-RAY image (S1060); extracting a second feature set from the fake X-RAY image of the item object in the list when a class in which the object to be read is to be classified is not determined and the object is not identified as an object corresponding to the class (S1070); and determining whether the object to be read expressed in the target X-RAY image matches the item object in the list based on the extracted first and second feature sets (S1080).

In step S1040, list information including one or more item objects is received. In an embodiment, a cargo list including one or more articles may be received as the list information including one or more item objects related to the object to be read (S1040). For example, if the cargo list related to the object to be read is submitted to the customs, the corresponding cargo list is received to read the object to be read in step S1040.

In step S1050, a non-X-RAY image of the article in the cargo list may be acquired through Internet web search.

In step S1050, a search query is generated based on identification information (e.g., product information) of the article in the cargo list, and a non-X-RAY type Internet image of the article in the list may be acquired by web search.

In one embodiment, step S1060 may include the steps of calculating segmentation information of the non-X-RAY image by segmenting an item object (e.g., an article in the cargo list) in the list information included in the non-X-RAY image into segments, wherein the segment is formed of an area of the item object or a part of the item object and the segmentation information includes at least one of boundary and location information of the segments in the image; calculating an outline area of the segment corresponding to the item object in the segmentation information; calculating texture information from an arbitrary X-RAY image; calculating an outline area of an object in the arbitrary X-RAY image by segmenting the arbitrary X-RAY image when the object is included in the arbitrary X-RAY image; calculating a texture map by removing the outline area of the object in the arbitrary X-RAY image the texture information; and applying the segmentation information and the texture map to an image conversion model.

In step S1060, the image conversion model is a model pre-learned to output a fake X-RAY image that is the same as or similar to a real X-RAY image of an object of the segmentation information photographed as a photographing object by the X-RAY photographing device in the background of the arbitrary X-RAY image. In step S1060, a search image of the article in the cargo list is converted into a fake X-RAY image of the article in the cargo list.

The image conversion model may generate a fake X-RAY image including the object of the segmentation information as a photographing object and the arbitrary X-RAY image as a background in terms of a texture map. When data is received, the fake X-RAY image is generated as output data that makes a data distribution and a restoration error of a training image used for learning to be minimized or to belong to the data distribution when the data is received.

The image conversion model is a machine learning model learned using a first training data set including a plurality of first training samples, wherein the first training data set may be sub-set into individual training objects. Since the first training data set is generated by the process of FIG. 6, detailed descriptions thereof will be omitted.

The first feature set and the second feature set extracted in step S1070 from the target X-RAY image of the object to be read extracted in step S1020 are extracted by applying the target X-RAY image and the fake X-RAY image of the article to the same reading model, respectively.

In an embodiment, step S1080 may include the steps of: calculating similarity between the first feature set and the second feature set; comparing the similarity with a preset threshold; and determining whether the object to be read matches the item object in the list based on the similarity.

In step S1080, when the similarity is equal to or greater than the threshold, it is determined that the object to be read matches the item object in the list.

In addition, the X-RAY image reading support method may further include performing steps S1020 to S1080 when there is another object to be read in the target X-RAY image after the matching of step S1080. This step may be repeated until reading is complete for some or all of another object to be read in the image.

If it is determined that it is not matched in step S1080, the object to be read is read as not being an article that has been compared in the cargo list.

When there is a plurality of articles in the cargo list, the following steps S1050 to S1080 after step S1040 may be performed on the plurality of articles in the cargo list. Then, the object to be read is compared again with the second feature set of another article in the cargo list.

If it is read that the object to be read does not match all the articles in the cargo list, it may be read that the object to be read disposed in the reading space is not included in the cargo list. At least one of the above-described reading results may be provided to the user.

When the X-RAY image reading support system 1000 and the X-RAY image reading support method are used, it is possible to support reading operations for various articles without limitation to real photographed images. This is because non-X-RAY images of various objects acquired through web search are converted into fake X-RAY images using a pre-learned image conversion model, and the reading model that identifies the object to be read is learned using the fake X-RAY images as learning data. Here, the image conversion model is learned to convert the photographing object into the same or similar fake X-RAY image which is difficult to be distinguished from a real X-RAY image obtained by directly photographing the photographing object with X-rays.

As a result, compared to a case of using an internal database in which the stored image is relatively limited, the X-RAY reading support system may be used for an unlimited range of cargo lists to have a high possibility of utilization.

In addition, if the object to be read is not identified as a result of the primary reading, it is possible to support more precise reading operations through the two-step reading process of generating a fake X-RAY image for an object of reference data and automatically comparing a target X-RAY image with the fake X-RAY image.

Meanwhile, in an embodiment, the image conversion model for generating the above-described fake X-RAY image from a non-X-RAY image is configured by learning GAN-based image generation from segmentation information of a SegNet-based image. Through this configuration, there is no need for requiring constraints to learn the image conversion model by necessarily configuring the non-X-RAY image and the real X-RAY image into a pair that has a correspondence relationship at a pixel level, and thus, there is high suitability for use to be suitable for practical use in customs.

The operations of the X-RAY image reading support system 1000 and method according to the above-described embodiments may be implemented at least partially by a computer program and then recorded in a computer-readable recording medium. For example, the operations are implemented with a program product composed of a computer-readable medium containing a program code, which may be executed by a processor for performing any or all steps, operations, or processes described above.

The computer may be a desktop computer, a laptop computer, a notebook, a smart phone, or a computing device similar thereto, or may be any device that may be integrated. The computer is a device with one or more alternative special-purpose processors, memories, storages, and networking components (either wireless or wired). The computer may execute, for example, an operating system compatible with Microsoft's Windows, Apple OS X or iOS, Linux distribution, or an operating system such as Google's Android OS.

The computer-readable recording medium includes all kinds of recording identification devices storing data which may be read by the computer. Examples of the computer-readable recording medium include a ROM, a RAM, a CD-ROM, a magnetic tape, a floppy disk, an optical data storage identification device, and the like. Further, the computer-readable recording medium may store and execute codes which are distributed in the computer system connected via a network and readable by a computer in a distributed manner. In addition, functional programs, codes, and code segments for implementing the embodiments will be easily understood by those skilled in the art to which the present embodiments belong.

The present invention described above has been described with reference to the embodiments illustrated in the drawings, but these embodiments are just illustrative, and those of ordinary skill in the art will understand that various modifications and changes of the embodiments may be made therefrom. However, these modifications should be considered to be within the technical protection scope of the present invention. Therefore, the true technical scope of the present invention should be defined by the technical idea of the appended claims.

An X-RAY reading support system according to an aspect of the present invention may segment an object in a non-X-RAY image using a machine learning technology, which is one of the fourth industrial technologies, and generate a fake X-RAY image same as or similar to a real X-RAY image of the object in the non-X-RAY image photographed directly with a photographing device. Accordingly, it is possible to acquire a fake X-RAY image for an unlimited range of articles, and further acquire various fake X-RAY images for the same article. As a result, the present invention has a high reading range and thus has very high industrial applicability in the field of inspection-related technology where X-RAY reading technology is used.

The X-RAY reading support system according to an aspect of the present invention may support reading operations for various articles without limitation to a real photographed image. This is because fake X-RAY images of various objects are generated based on web search, and a reading model that identifies an object to be read is learned using the generated fake X-RAY images as learning data.

As a result, compared to a case of using an internal database in which the stored image is relatively limited, the X-RAY image reading support system may be used for an unlimited range of cargo lists, thus having a high possibility of utilization.

In addition, if the object to be read is not identified as a result of the primary reading, it is possible to support more precise reading operations through the two-step reading process of generating a fake X-RAY image for an object of reference data and automatically comparing a target X-RAY image with the fake X-RAY image.

Meanwhile, in an embodiment, the image conversion model for generating the above-described fake X-RAY image from a non-X-RAY image is configured by learning GAN-based image generation from segmentation information of a SegNet-based image. Through this configuration, there is no need for requiring constraints to learn the image conversion model by necessarily configuring the non-X-RAY image and the real X-RAY image into a pair that has a correspondence relationship at a pixel level, and thus, there is high suitability for use to be suitable for practical use in customs.

The effects of the present invention are not limited to the aforementioned effect, and other effects not mentioned above will be clearly understood to those skilled in the art from the description of the appended claims.

While the present invention has been described with respect to the specific embodiments, it will be apparent to those skilled in the art that various changes and modifications may be made without departing from the spirit and scope of the invention as defined in the following claims.

What is claimed is:

1. An X-RAY image reading support system comprising:
   an X-RAY photographing device configured to photograph a target X-RAY image by transmitting or reflecting X-RAY in a reading space in which an object to be read is disposed;
   an interface unit configured to receive list information on an object;
   an image search unit configured to acquire a non-X-RAY image of the object, wherein the image search unit generates a search query for the corresponding object based on identification information of the object included in the list information on the object and transmits the search query to a web server to receive the searched image as the non-X-RAY image of the object;

an image conversion unit configured to convert a non-X-RAY image of an item object in a list into a fake X-RAY image; and an article discrimination unit configured to identify the object to be read based on a first feature set extracted by applying the target X-RAY to a reading model for extracting features from an input image.

2. The X-RAY image reading support system of claim 1, wherein the web server is a server that is configured to be accessible through a world wide web and enabled for web search.

3. The X-RAY image reading support system of claim 1, wherein the image conversion unit is configured to calculate segmentation information of the non-X-RAY image by segmenting the object of the non-X-RAY image into segments, wherein the segment is formed of an area or a partial area of the object and the segmentation information includes at least one of boundary and location information of the segment in the image,
calculate an outline area of the segment corresponding to the object from the segmentation information,
calculate a texture map from an arbitrary X-RAY image, and
apply the segmentation information and the texture map to an image conversion model.

4. The X-RAY image reading support system of claim 3, wherein the image conversion model is pre-learned to output a fake X-RAY image that is the same as or similar to a real X-RAY image of the object of the segmentation information photographed as a photographing object by the X-RAY photographing device in a background of the arbitrary X-RAY image.

5. The X-RAY image reading support system of claim 3, wherein the image conversion unit is further configured to, when the object is included in the arbitrary X-RAY image, calculate an outline area of the object in the arbitrary X-RAY image by segmenting the arbitrary X-RAY image, and
calculate a texture map by removing the outline area of the object in the arbitrary X-RAY image from the texture information.

6. The X-RAY image reading support system of claim 3, wherein the image conversion unit is further configured to randomly arrange the segments of the segmentation information at one or more different locations,
wherein the segmentation information applied to the image conversion model includes a segment disposed at an original location and a segment randomly disposed at another location in the non-X-RAY image.

7. The X-RAY image reading support system of claim 6, wherein the image conversion unit generates a composite image including the segment in the segmentation information as an object and the texture map as a background, and
applies the composite image to the image conversion model.

8. The X-RAY image reading support system of claim 3, wherein the segmentation information is calculated by applying the searched non-X-RAY image of the item object in the list to a segmentation model, and
the segmentation model is configured to label pixels of the input image with a pre-learned class.

9. The X-RAY image reading support system of claim 3, wherein the arbitrary X-RAY image is a real X-RAY image of the reading space.

10. The X-RAY image reading support system of claim 3, wherein the image conversion model is learned to generate, as a fake X-RAY image, data of an output image that makes a data distribution and a restoration error of a training image used for learning to be minimized or to belong to the data distribution when the data is received.

11. The X-RAY image reading support system of claim 10, wherein the image conversion model is a model learned using a first training data set including a plurality of first training samples,
wherein each of the plurality of first training samples includes a real X-RAY image of a first training object, segmentation information and a texture map of the real X-RAY image of the first training object, respectively, or
includes the real X-RAY image of the first training object, and a composite image based on the segmentation information and the texture map of the real X-RAY image of the first training object, respectively.

12. The X-RAY image reading support system of claim 11, wherein the first training sample is generated by calculating segmentation information by segmenting the first training object into segments in the real X-RAY image of the first training object,
calculating an outline area of the first training object from the segmentation information,
calculating texture information from the real X-RAY image of the training object, and
calculating a texture map by removing the outline area of the first training object from the texture information.

13. The X-RAY image reading support system of claim 1, wherein the non-X-RAY image is an image photographed with visible light.

14. The X-RAY image reading support system of claim 1, wherein the reading model includes a feature extraction portion for extracting features from the input image; and
a classification portion for classifying the object of the input image into a class set using the training data set based on the extracted features,
wherein the reading model is a machine learning model learned using a second training data set including a plurality of second training samples, wherein the second training data set is sub-set into individual objects, and
each of the plurality of second training samples includes a real X-RAY image of the second training object or a fake X-RAY image of the second training object.

15. The X-RAY image reading support system of claim 14, wherein the article discrimination unit identifies the object to be read as an object corresponding to the classified class when the object to be read is classified as a set class based on the first feature set extracted from the target X-RAY image.

16. The X-RAY image reading support system of claim 14, wherein when the object to be read is not identified by the reading model,
the interface unit receives list information including one or more item objects related to the object to be read,
the image search unit acquires a non-X-RAY image of an item object in a list related to the object to be read based on the list information,
the image conversion unit converts the non-X-RAY image of the item object in the list into a fake X-RAY image, and
the article discrimination unit is further configured to extract a second feature set from the fake X-RAY image of the item object in the list by applying the fake X-RAY image of the item object in the list to the feature extraction portion, and identify the object to be read as the item object in the list when it is determined that the object to be read expressed in the target X-RAY image matches the item object in the list based on the extracted first and second feature sets.

17. An X-RAY image reading support method which is performed by a processor, comprising the steps of:

acquiring a target X-RAY image photographed by transmitting or reflecting X-RAY in a reading space in which an object to be read is disposed;

applying the target X-RAY image to a reading model that extracts features from an input image; and identifying the object to be read as an object corresponding to a classified class when the object to be read is classified as a set class based on a first feature set extracted from the target X-RAY image, wherein the reading model includes a portion of extracting features from the input image and a portion of classifying the object of the input image as a class set using a plurality of training samples based on the extracted features, and the reading model is a machine learning model learned using the plurality of first training samples, wherein the plurality of first training samples are sub-set into individual objects, and each of the plurality of first training samples includes a real X-RAY image or a fake X-RAY image of the first training object, respectively.

18. The X-RAY image reading support method of claim 17, wherein the fake X-RAY image is generated by calculating segmentation information from a non-X-RAY image of the first training object by segmenting the first training object into segments, wherein the segment is formed of an area or a partial area of the first training object and the segmentation information includes at least one of boundary and location information of the segment in the image, calculating an outline area of the first training object from the segmentation information, calculating a texture map from an arbitrary X-RAY image, and applying the segmentation information of the first training object and the texture map of the arbitrary X-RAY image to an image conversion model.

19. The X-RAY image reading support method of claim 18, wherein the image conversion model is pre-learned to output a fake X-RAY image that is the same as or similar to a real X-RAY image of an object of the segmentation information photographed as a photographing object by the X-RAY photographing device in a background of the arbitrary X-RAY image.

20. The X-RAY image reading support method of claim 17, further comprising the steps of:

receiving list information including one or more item objects related to the object to be read;

acquiring a non-X-RAY image of an item object in a list related to the object to be read based on the list information;

converting the non-X-RAY image of the item object in the list into a fake X-RAY image;

extracting a second feature set from the fake X-RAY image of the item object in the list when the object to be read is not identified as a class; and identifying the object to be read as the item object in the list when it is determined that the object to be read expressed in the target X-RAY image matches the item object in the list based on the extracted first and second feature sets.

21. The X-RAY image reading support method of claim 20, wherein the reading model is a machine learning model learned using a second training data set including a plurality of second training samples, wherein the second training data set is sub-set into individual objects, wherein each of the plurality of second training samples includes a real X-RAY image of the second training object or a fake X-RAY image of the second training object, respectively.

22. A non-transitory computer-readable recording medium which is readable by a computing device and stores program commands operable by the computing device, wherein when the program commands are executed by a processor of the computing device, the processor performs the steps of:

acquiring a target X-RAY image photographed by transmitting or reflecting X-RAY in a reading space in which an object to be read is disposed;

applying the target X-RAY image to a reading model that extracts features from an input image; and identifying the object to be read as an object corresponding to a classified class when the object to be read is classified as a set class based on a first feature set extracted from the target X-RAY image, wherein the reading model includes a portion of extracting features from the input image and a portion of classifying the object of the input image as a class set using a plurality of training samples based on the extracted features, and the reading model is a machine learning model learned using the plurality of first training samples, wherein the plurality of first training samples are sub-set into individual objects, and each of the plurality of first training samples includes a real X-RAY image of the first training object or a fake X-RAY image of the first training object, respectively.

* * * * *